April 30, 1929.  O. U. ZERK  1,710,719
LUBRICANT COMPRESSOR
Filed April 19, 1924
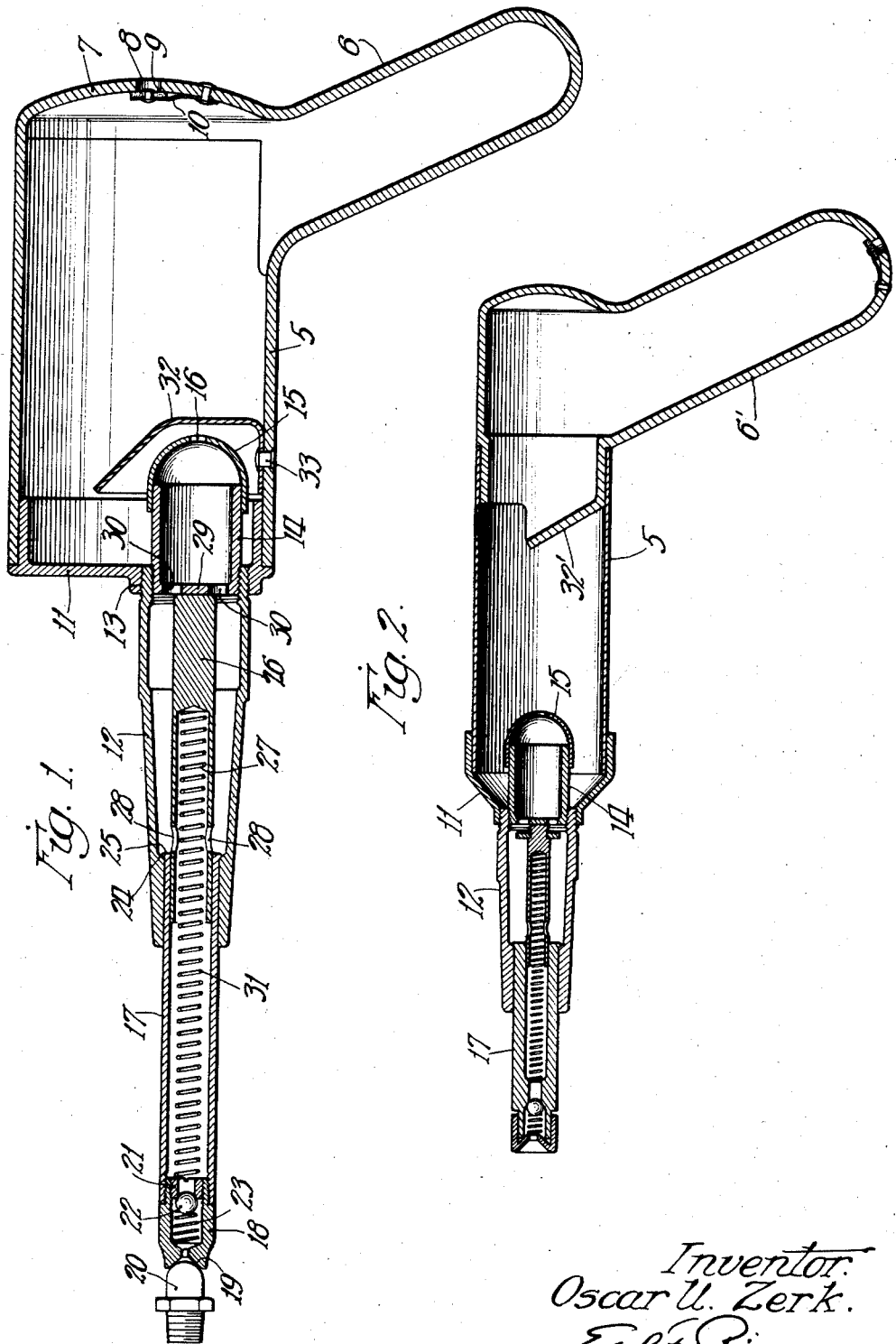
Inventor:
Oscar U. Zerk.
Atty.

Patented Apr. 30, 1929.

1,710,719

UNITED STATES PATENT OFFICE.

OSCAR U. ZERK, OF CLEVELAND, OHIO, ASSIGNOR TO ALEMITE MANUFACTURING CORPORATION, OF CHICAGO, ILLINOIS, A CORPORATION OF DELAWARE.

LUBRICANT COMPRESSOR.

Application filed April 19, 1924. Serial No. 707,696.

My invention relates to improvements in lubricant compressors and is particularly concerned with the provision of a novel type of lubricant compressor by means of which lubricant, under pressure, can be delivered to bearings, to be lubricated.

One of the objects of my invention is to provide a lubricant compressor for supplying lubricant, under pressure, to the bearing, so constructed and arranged that it can be used for suplying lubricant, and particularly fluid lubricants, to bearings, irrespective of their positions and the angles from which they must be approached.

Another object of my invention is to provide a lubricant compressor for supplying the more fluid lubricants to bearings comprising a barrel or reservoir for holding a supply of lubricant, a cylinder for receiving lubricant from the barrel, a plunger coacting with the cylinder, to eject lubricant therefrom, and means for insuring a supply of lubricant to the cylinder even though the supply of lubricant in the barrel is practically exhausted; these parts being so arranged in such manner that lubricant can be supplied to bearings in different positions.

Another object of my invention is to provide a compressor of the character described which is simple in construction, economical to manufacture and easy to operate.

Other objects of my invention will appear as this description progresses, reference being had to the accompanying drawings in which, Figure 1 is a central longitudinal section through one embodiment of my invention and Figure 2 is a central longitudinal section through another embodiment of my invention.

Referring to the drawings, my improved compressor comprises a barrel 5 having the hollow handle 6 secured thereto adjacent one end and communicating therewith. The end 7 of the barrel is provided with a breather port 8 which is closed by the inwardly opening valve 9. This valve is yieldingly held in its closed position by a light leaf spring 10.

A second closure 11 is pressed into the opposite end of the barrel 5, and supports the guide tube 12 which is secured thereto by the threaded connection 13. A sleeve 14 is threaded into the inner end of the guide tube 12 and projects inwardly therefrom. This sleeve terminates in a cap 15 which is provided with the inlet port 16.

A cylinder 17 is slidably mounted in the outer end of the guide tube 12, and terminates in a cap or coupling member 18 having a conical depression 19, for coacting with a fitting 20, which is adapted to be secured to a bearing to be lubricated. A collar 21 is threaded into the inner end of the coupling member 18 and acts as a seat for the ball closure 22, which is yieldingly held against the seat by means of the spring 23.

The sleeve 12 and the cylinder 17 are provided with the coacting shoulders 24 and 25 respectively, which limit the outward movement of the cylinder 17.

The plunger 26, the front end of which is provided with the bore 27, is mounted to reciprocate in the cylinder 17 and in this manner functions to displace lubricant from the cylinder 17. The wall of the hollow portion of the plunger 26 is provided with a plurality of ports 28 which communicate with the space between the guide tube 12 and the plunger 26.

The rear end of the plunger 26 bears against the central portion of the disk 29 that forms a part of the sleeve 14. This disk is provided with a plurality of ports 30 for the passage of lubricant. A compression spring 31 is confined by the cylinder 17 and the hollow portion of the plunger 26, and its ends abut the collar 21 and the end of the bore 27 respectively, in such manner that the spring tends to hold the cylinder 17 and the plunger 26 in separated relation.

Surrounding the inner end of the sleeve 14 and the cap 15 is a cup shaped dam 32 which extends entirely across the barrel 5 of the compressor.

The dam 32 is held in position by being riveted to the barrel 5 as shown at 33 or in any other suitable manner.

In the use of my improved compressor the guide tube 12 with its associated parts is removed from the barrel 5, and the latter is filled through the opening thus formed. The guide tube is then replaced. In supplying lubricant to a bearing provided with a fitting 20, the operator places the coupling member 18 against the end of the fitting, as shown in the drawing, and then pushes upon the handle in such manner as to move the barrel 5 toward the fitting. This causes the outer end of the plunger 26 to move into the guide tube 17. The initial portion of this movement causes the ports 28 to be closed by the guide tube 17, and thereafter continued movement of the plunger 26 into the cylinder 17 causes the contents of the latter to be discharged past the ball 22, and into the fitting 20. When the forward stroke of the compressor has been completed the operator releases the pressure upon the handle 6 whereupon the spring 31 returns the parts to the positions shown in Figure 1. As the plunger 26 moves out of the cylinder 17 a more or less complete vacuum is created in this cylinder, and when the ports 28 clear the inner end of the cylinder 17 this vacuum causes lubricant to be sucked into the cylinder 27 so that it becomes filled or primed.

The dam 32 is provided for the purpose of insuring a supply of lubricant to the cylinder 17 for when the quantity of lubricant in the barrel has decreased to the point where the lubricant in the cylinder 17 would drain out of this cylinder, if it were necessary to elevate the coupling member 18 above the level of the oil in the compressor, in order to supply lubricant to a fitting 20.

With the construction just described the operator, by permitting the compressor to drop at his side, or to assume a position in which the cylinder 17 is below the barrel 5, each time he removes the compressor from a fitting, will cause the lubricant to flow downwardly in the end of the barrel adjacent the end of the barrel closed by the closure 11. Thereafter, if he should elevate the outer end of the cylinder 7 above the barrel 5, the dam 32 will retain and hold sufficient lubricant in what is then the upper end of the barrel for charging the cylinder several times, before it becomes necessary for the operator to again momentarily depress the cylinder 17 below the level of the barrel 5.

The compressor illustrated in Figure 2 is similar to that shown in Figure 1, except that the handle 6' is made integral with the barrel 5, and embodies the inclined dam 32' which extends entirely across the barrel 5 in one direction and partially across the barrel 5 in the other direction. This dam serves substantially the same purpose as that illustrated in Figure 1, and described above, and further description of the construction shown in this figure is believed to be unnecessary.

The particular or detailed constructions of the two different means disclosed in Figures 1 and 2 for discharging the lubricant into a fitting under high pressure form no part of my present invention, except as they cooperate with the remaining parts of the devices. These high pressure or discharge devices are illustrated and claimed in my copending application, Case 5, filed of even date herewith.

While I have described the details of construction of the preferred embodiments of my invention it is to be clearly understood that my invention is not limited to these details, but is capable of other adaptations and modifications, within the scope of the appended claims.

Having thus described my invention what I claim is:

1. A high pressure lubricant compressor of the class described comprising, in combination, a reservoir, a pistol-grip extending from one side of said reservoir, high pressure compressing means extending from one end of said reservoir, said compressing means communicating with said reservoir through an inlet adjacent the side of said reservoir from which said grip extends, and a dam attached to said side of said reservoir, said dam extending partly across said reservoir and serving to trap lubricant over said inlet to permit discharge of lubricant when said discharge means is pointed upwardly.

2. In lubricating apparatus of the class described, a reservoir, a pistol-grip extending from one side of said reservoir, high pressure compressing means projecting from one end of said reservoir, said compressing means having an inlet communicating with the interior of said reservoir and located adjacent said end thereof, and a dam extending from said side of the reservoir, said dam terminating short of the other side of said reservoir and serving to trap lubricant adjacent said inlet when said discharge means is pointed upwardly.

3. A lubricant compressor of the class described comprising, in combination, a reservoir having an end, guide means carried by said end, a high pressure cylinder reciprocable in said guide means, a plunger for said cylinder, a member forming a support for said plunger and providing an intake for said cylinder, and a dam adjacent the reservoir end of said inlet, to retain lubricant over said inlet end when said cylinder is pointed upwardly.

In testimony whereof I have hereunto signed my name this 1st day of April, 1924.

OSCAR U. ZERK.